United States Patent [19]

Gosdin et al.

[11] Patent Number: 5,599,487
[45] Date of Patent: Feb. 4, 1997

[54] METHOD AND DEVICE FOR FABRICATING PLASTIC OBJECTS FROM THERMOPLASTIC MATERIAL

[75] Inventors: Michael Gosdin; Helmut Eckardt, both of Meinerzhagen, Germany

[73] Assignee: Battenfeld Holding GmbH, Meinerzhagen, Germany

[21] Appl. No.: 435,986

[22] Filed: May 5, 1995

[30] Foreign Application Priority Data

Dec. 21, 1994 [DE] Germany .................. 44 45 622.0

[51] Int. Cl.⁶ ........................................ B29C 45/76
[52] U.S. Cl. ................. 264/40.1; 264/572; 425/130; 425/135
[58] Field of Search .................. 264/572, 40.1; 425/130, 135

[56] References Cited

U.S. PATENT DOCUMENTS

| | | | |
|---|---|---|---|
| 4,211,523 | 7/1980 | Hunerberg | 264/50 |
| 5,047,183 | 9/1991 | Eckardt et al. | 264/40.3 |
| 5,056,997 | 10/1991 | Hayashi et al. | 425/130 |
| 5,112,563 | 5/1992 | Baxi | 264/572 |
| 5,246,646 | 9/1993 | Baxi | 264/572 |

FOREIGN PATENT DOCUMENTS

| | | | |
|---|---|---|---|
| 0382690A2 | 8/1990 | European Pat. Off. | B29C 45/17 |
| 2800482 | 7/1978 | Germany | 264/572 |
| 3734164A1 | 4/1989 | Germany | B29C 49/06 |

OTHER PUBLICATIONS

"Sandwich Moulding—Competitor or Complement to Conventional Injection Moulding?–Specific Product Quality Demands New Production Processes–AirMould–Multi-Foam," *Injection Moulding Sets Course for the Nineties- -Improved Quality–Reduced Costs Through New Processes and Flexible Solutions, Battenfeld,* pp. 6/1–6/9, 6a–6g (Oct. 1987).

*Primary Examiner*—Catherine Timm
*Attorney, Agent, or Firm*—Hamilton, Brook, Smith & Reynolds, P.C.

[57] ABSTRACT

The invention relates to a method for fabricating hollow plastic objects of thermoplastic material, comprising the following steps: 1) injecting melt into the tool cavity (1,2); b) Simultaneously and/or subsequently introducing a pressurized fluid into the melt, so that the melt which has been introduced into the molding tool (1, 2) is distributed in the cavity and is pressed against the walls of the molding tool (1, 2), the pressurized fluid being conducted from a pressurized container (5) into the melt, and the pressurized container (5) being supplied with fluid by a compressor (7) which contains a drive element (6); c) allowing the molded part (8) to cool; and d) relieving the cavity of the pressure of the pressurized fluid. According to the invention, the drive element (6) of the compressor (7) is maintained at a temporally constant power level (P) at least over the production of a large number of plastic objects. This power level is advantageously calculated from the ratio of the work (W) which must be done by the drive element (6) in order to furnish an amount of pressurized fluid that is needed for a certain number of plastic objects over an associated total cycle time (T), relative to this cycle time (T). As a result, the drive element (6) operates continuously, which results in favorable energy conditions and lower wear.

11 Claims, 1 Drawing Sheet

1

METHOD AND DEVICE FOR FABRICATING PLASTIC OBJECTS FROM THERMOPLASTIC MATERIAL

BACKGROUND OF THE INVENTION

The invention relates to a process for fabricating hollow plastic objects of thermoplastic material. According to the process, a sufficient amount of plastic melt is injected into the cavity of a molding tool along a melt flow path which extends from a plasticizing unit, through a plastic injection nozzle, to the molding tool. A pressurized fluid, especially a pressurized gas, is simultaneously and/or subsequently introduced into the melt, so that the melt in the molding tool is distributed in the cavity and is pressed against the walls of the molding tool. The pressurized fluid is conducted from a pressurized container into the melt, and the pressurized container is in turn supplied with fluid by a compressor having a drive element. The molded part produced in this way is allowed to cool to a temperature below the melting point of the thermoplastic material, and the cavity is relieved of the pressure of the pressurized fluid.

A method of this generic type is known from the DE 37 34 164 A1, which concerns injection molding hollow molded parts from thermoplastics. Specifically, a quantity of the liquid melted plastic sufficient to form the molded part is first pressed into the injection mold. Then a flowable medium, especially a gas, is pressed into the injection mold and into the thermoplastic at a pressure which distributes the plastic mass uniformly over the surface of the mold cavity so as to form a hollow body. Then the hollow body, while being maintained under the pressure of the medium, is cooled in the injection mold. Finally, the pressure of the medium is released from the hollow body, the molded part is demolded and is taken from the injection mold.

The pressurized fluid is supplied from a pressurized container that is connected to a compressor. The compressor transports the gas into the pressurized container, and specifically in such a fashion that this pressurized container is always maintained at a prescribed minimum pressure. This operation is achieved by elements known from the prior art. A pressure sensor which measures the actual current gas pressure is situated in the pressurized container. The pressure sensor provides a signal to a control unit that controls the drive element (motor) of the compressor. An upper and lower limit for the gas pressure in the pressurized container is prescribed to the control unit. If the pressure in the container falls below this lower limit—due to the withdrawal of pressurized fluid or due to leakage—the compressor motor is started; the motor pumps additional fluid into the pressurized container, so that the pressure in the latter rises. The compressor drive is here dimensioned sufficiently so that the desired pressure in the pressurized container is reached even during maximum demand for pressurized fluid. The motor continues to operate until the pressure sensor reports that the upper limit for the pressure has been reached; then the compressor drive is turned off by the control unit.

SUMMARY OF THE INVENTION

The above-described operation of the compressor—pressurized container system has the disadvantage in that the nature of this system results in saw-toothed oscillatory operation, i.e. the pressure in the pressurized container runs through a zig-zag curve over the course of time, due to the discontinuous operation of the compressor. This represents an unfavorable mode of operating the compressor pressurized memory system, due to the poor energy efficiency.

Furthermore, all control and regulation elements are exposed to a constant on-off switching operation, which has an unfavorable effect on the lifetime of various components of the system.

It is therefore an object of the invention to create a method and device that avoids these disadvantages and thus permits better energy efficiency and less wear-intensive way of operating the compressor—pressurized container system.

This object is achieved by the invention in that the drive element, for example a motor, of the compressor is maintained at a power level which remains constant in time, at least over the production of a large number of plastic objects.

According to the invention, therefore, there is no longer any on-off switching operation for the compressor—drive element, but the drive motor only runs steadily and continuously.

The power level at which the drive element is maintained is constant in time. It is adjustable and is derived from the demand of pressurized fluid in connection with the injection molding process. The power level is determined by the following steps:

first, determination of the work (W), which must be done by the drive element in order to furnish the amount of pressurized fluid which is needed for a certain number of plastic objects during an associated total cycle time (T);

calculation of the power level (P) of the drive element (6), according to the formula:

$$P = W/T;$$

prescription of the calculated power level (P) as the basic setting for the drive power of the drive element.

It may happen that, in the course of fabricating plastic objects, the above mode of operation causes errors or inaccuracies in the determination of the power to add cumulatively. As a result over the course of time, the pressure in the pressurized container will tend to deviate from the setpoint. The invention therefore provides that, after plastic objects have been produced for a predetermined, i.e. prescribed, time, or after a prescribed number of objects has been produced, the power level (P) of the drive element is checked and is adjusted if necessary.

The power can be specified by electrical or electronic control units, but also by mechanical or hydraulic ones.

This method is advantageously used in the mass production of plastic objects, since in these applications a very constant average of the power demand of the drive element under continuous operating conditions can generally be determined.

The inventive process is also advantageously used in connection with multi-machine operation, that is where one fluid supply system supplies several injection molding machines with pressurized fluid. The inventive method is observed to have the following advantages:

1) The drive power for the drive element of the compressor is minimized, since the continuous mode of operation is more efficient than constant switching between full load and zero;

2) The pressure in the pressurized container is subject to less variation since, according to the invention, an average is maintained and the pressure no longer moves permanently back and forth between a lower and an upper limit;

3) The apparatus required to implement the inventive method can have a simpler design since the control circuit, including the associated sensors that are needed for operation according to the prior art, are not required here; and 4) The components of the compressor—container system are no longer exposed to the high stress caused by conventional operation (switching on and off), since the system load is now uniform.

The above and other features of the invention including various novel details of construction and combinations of parts, and other advantages, will now be more particularly described with reference to the accompanying drawings and pointed out in the claims. It will be understood that the particular method and device embodying the invention is shown by way of illustration and not as a limitation of the invention. The principles and features of this invention may be employed in various and numerous embodiments without the departing from the scope of the invention.

DETAILED DESCRIPTION OF THE DRAWINGS

Figure 1:
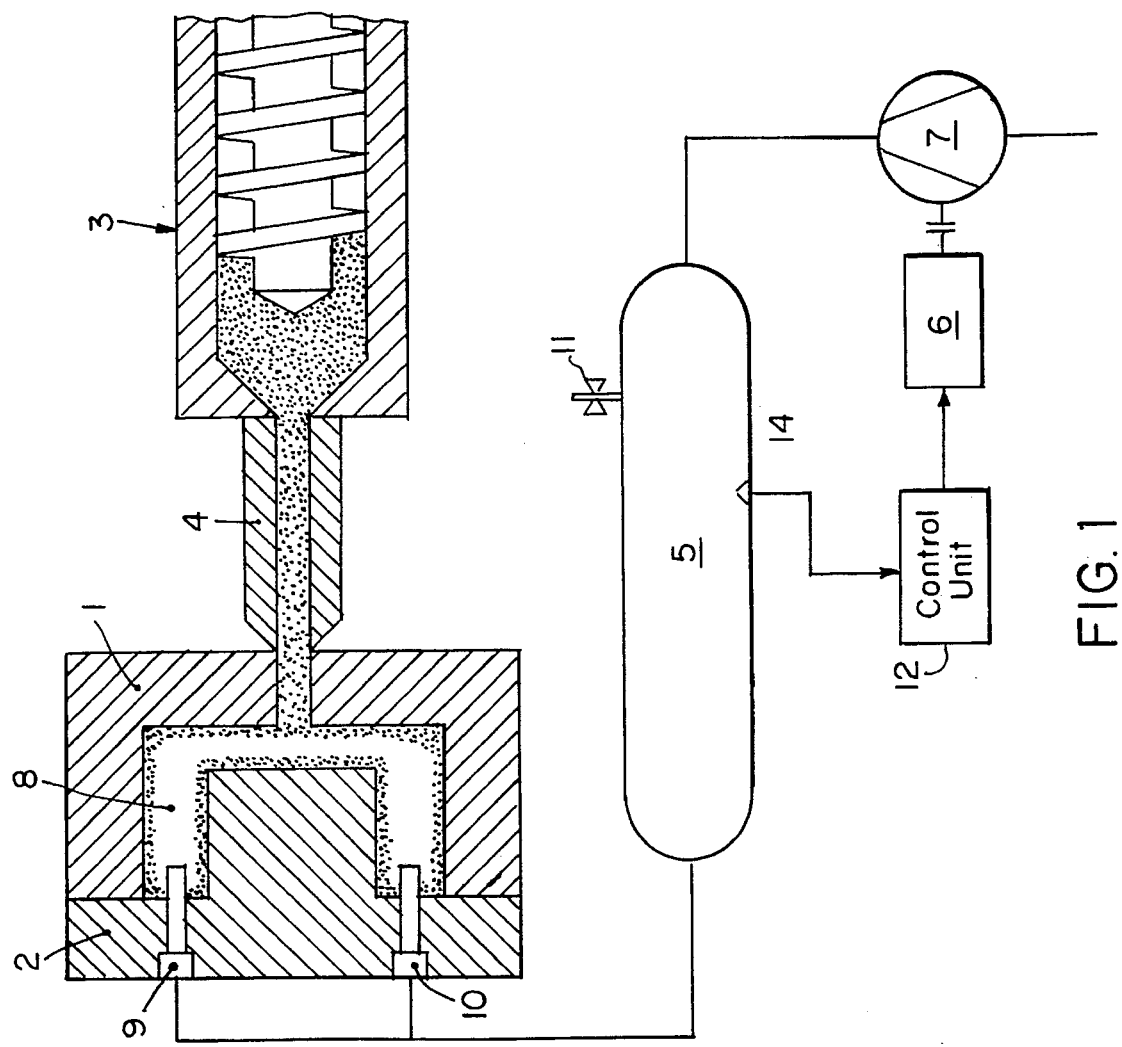
FIG. 1 schematically shows an injection molding device of the present invention.

FIG. 1 shows a molding tool 1, 2, having two mold halves 1 and 2. A plasticizing unit 3 converts the plastic granulate into a melt. Via the plastic injection nozzle 4, this melt is injected into the cavity of the molding tool 1, 2; the melt here passes from the plasticizing unit 3, through the injection nozzle 4, into the cavity. The amount of melt is sufficient to fabricate the desired work piece, taking any cavities into account.

Simultaneously and/or subsequently with the filling of the tool cavity, a pressurized fluid is placed into the cavity; nitrogen gas ($N_2$) is customarily used here, supplied from a pressurized container 5. The pressurized gas distributes the melt in the cavity and presses it against the walls of the tool 1, 2. When the melt has cooled sufficiently, the tool 1, 2 can be demolded, the work piece 8 is thus withdrawn. In the present case, the pressurized fluid is introduced into the work piece 8 through gas inlet and outlet nozzles 9 and 10. However, alternatively it is also possible (not shown) to introduce the gas through the nozzle area, i.e. plastic injection nozzle 4.

The pressurized container 5 is connected via a pressure line to a compressor 7. The compressor is driven by a drive element 6. An electric motor is usually used for this purpose, but naturally other drive elements are also possible alternatives. A control unit 12 controls the operation of the device element 6. A pressure sensor 14 provides an indication of the pressure within container 5 to the control unit 12.

During the entire production process—at least during the production of a defined batch of plastic objects—the drive element 6 is operated at a power level P by control unit 12 that remains constant in time, i.e. P represents a constant power which is applied by the drive element 6.

Figure 2:
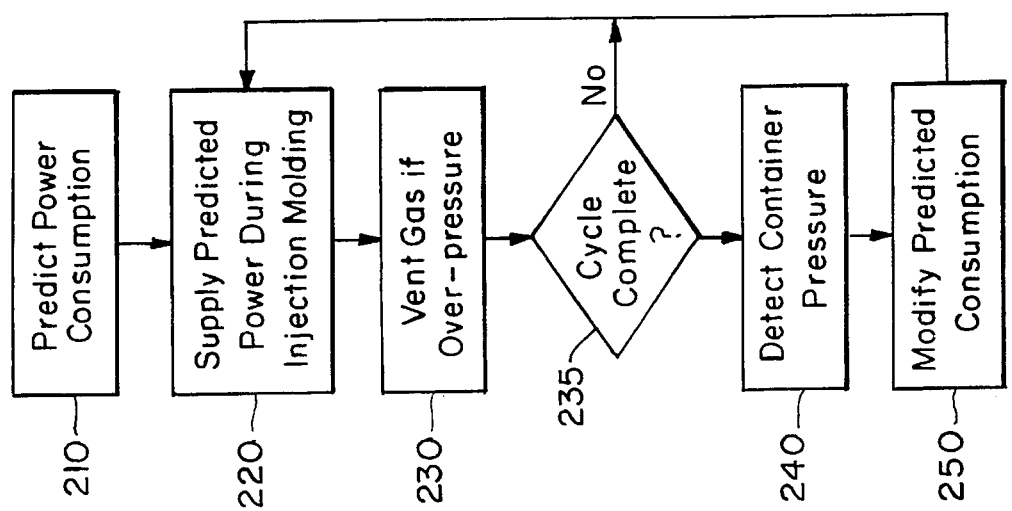
FIG. 2 is a flow diagram showing the inventive method of operation of the injection molding device.

As shown in FIG. 2, an initial prediction of the power P is first derived by control unit 12 as the ratio of the work W, to be done over a defined period of time in order to fabricate the desired hollow objects, relative to the total cycle time T needed in step 210, $P = W/T$.

Consequently, no conventional on-and-off switching process of the driving element 6 is needed in order to supply the required amount of pressurized fluid during the injection molding process step 220.

If, through an error, the average power P should be too low, the capacity of the pressurized container 5 represents a buffer which even then permits proper production.

If the average power P should be adjusted too high, more pressurized fluid than is needed will be produced over the long term. Then the pressure in the container rises permanently. An over-pressure valve 11 is provided for this case, to prevent the pressure in the container from rising impermissibly and possibly also dangerously step 230. The gas escaping from the over-pressure valve preferably is recycled into the nitrogen supply line, so that no unnecessary loss of gas occurs.

To increase the efficiency of the method, the power P derived by the above formula in practice is first prescribed as the basic setting before starting up the injection molding machine. The power is therefore set on the basis of the expected consumption of fluid. If the expected consumption is identical to the actual one, the compressor 7 runs in continuous operation in such a way that a permanently constant setpoint pressure is established in the pressurized container.

However, certain errors in the power calculation in general can not be excluded, so that, in the long term, the pressure in the container 5 will deviate from the setpoint pressure. Consequently, the pressure is checked in step 240 by control unit 12 after a prescribed production time or after the fabrication of a defined number of work pieces as determined in step 235, and the power level of the drive element 6 is adjusted as necessary. This is done automatically by the machine control unit.

After a prescribed time, the pressure in the pressurized container is queried. If it deviates from the desired setpoint pressure, a new prediction of the power level P is made in step 250 by control unit 12. The power setting for the next production run is then modified correspondingly. This can be done, for example, by means of a table of values, stored in the machine control, of the following form:

| Pressure Deviation Relative to the Set-Point Pressure By: | Adjustment of the Power Level B by: |
| --- | --- |
| −4% | +5% |
| −3% | +3.5% |
| −2% | +2.2% |
| −1% | +1% |
| 0% | 0% |
| +1% | −1% |
| +2% | −2.3% |
| +3% | −3.7% |
| +4% | −4.8% |

Values between the tabulated ones are dealt with by interpolation. The numerical values in the above table are obtained experimentally for each individual compressor—container system and from the basic production task. The drive power can be checked and adjusted as necessary at regularly repeated intervals.

As control or regulation elements for the power level one can use e.g. electronic elements which control an electric motor whose rotational speed can be regulated. Further, while using an electric motor operating at a constant rotational speed, it is also possible to use a continuously adjustable mechanical transmission to adjust the rotational speed of the compressor and thus the power.

While this invention has been particularly shown and described with references to preferred embodiments thereof, it will be understood by those skilled in the art that various changes in form and details may be made therein without departing from the spirit and scope of the invention as defined by the appended claims.

We claim:

1. A method for fabricating plural hollow plastic objects of thermoplastic material, comprising:
   a) injecting a sufficient amount of plastic melt into a cavity of a molding tool along a melt flow path which extends from a plasticizing unit, through a plastic injection nozzle, to the molding tool;
   b) simultaneously and/or subsequently introducing a pressurized fluid into the melt, so that the melt in the molding tool is distributed in the cavity against the walls of the molding tool, the pressurized fluid being conducted from a pressurized container into the melt, and the pressurized container being supplied with fluid by a compressor including a drive element;
   c) allowing the plastic to cool to a temperature below a melting point of the plastic to produce a first one of the hollow plastic objects;
   d) relieving the pressure of the pressurized fluid from within the first one of the hollow plastic objects;
   e) removing the first one of the hollow plastic objects from the molding tool;
   f) repeating steps a) through e) to produce plural ones of the hollow plastic objects; and
   g) maintaining a power level of the drive element of the compressor constant over time, at least over the production of the plural ones of the hollow plastic objects.

2. The method of claim 1, wherein the power level (P) of the drive element is determined by the following steps:
   a) determining work (W), which must be done by the drive element in order to furnish pressurized fluid which is needed for a certain number of plastic objects during an associated total cycle time (T);
   b) calculating of the power level (P) of the drive element, according to the formula:

$P = W/T;$ c) prescription of the calculated power level as the basic setting for the drive power of the drive element.

3. The method of claim 1, further comprising after plural plastic objects have been produced for a predetermined time, the power level of the drive element is checked and is modified in response to a pressure within the container if necessary.

4. The method of claim 1, wherein the power level of the drive element is prescribed by an electronic control unit.

5. The method of claim 1, wherein the power level of the drive element is prescribed by a mechanical control unit.

6. The method of claim 1, wherein the power level of the drive element is prescribed by an hydraulic control unit.

7. The method of claim 1, further comprising mass producing the plastic objects.

8. The method of claim 1, wherein one pressurized container supplies several injection molding machines with pressurized fluid.

9. A method for fabricating hollow plastic objects of thermoplastic material with a molding device including: a molding tool for forming the plastic objects, a plasticizing unit for injecting melted thermoplastic material into the molding tool through a plastic injection nozzle, a container for supplying a pressurized fluid into the molding tool to distribute the thermoplastic melt against the walls of the molding tool, a compressor for supplying pressurized fluid to the container, and a control unit for controlling a power level of the compressor drive unit; the method comprising
   a) injecting a sufficient amount of plastic melt into a cavity of the molding tool along a melt flow path which extends from the plasticizing unit, through the plastic injection nozzle, to the molding tool;
   b) simultaneously and/or subsequently introducing the pressurized fluid into the melt, so that the melt in the molding tool is distributed in the cavity against the walls of the molding tool, the pressurized fluid being conducted from the pressurized container into the melt;
   c) allowing the plastic to cool to a temperature below a melting point of the plastic to produce a first one of the hollow plastic objects;
   d) relieving the pressure of the pressurized fluid from within the first one of the hollow plastic objects;
   e) removing the first one of the hollow plastic objects from the molding tool;
   f) repeating steps a) through e) to produce plural ones of the hollow plastic objects; and
   g) maintaining a constant power level to the drive element over time, at least over the production of the plural ones of the hollow plastic objects.

10. A method as described in claim 9, wherein the control unit modifies the constant power level periodically in response to a pressure signal from a pressure detector of the container.

11. The method of claim 1 further comprising forming essentially a single cavity in the melt with the pressurized fluid.

* * * * *